Nov. 3, 1964    C. A. CRESWELL    3,154,960
DRIVE BELTS
Filed Oct. 7, 1963    2 Sheets-Sheet 1
FIG.1.
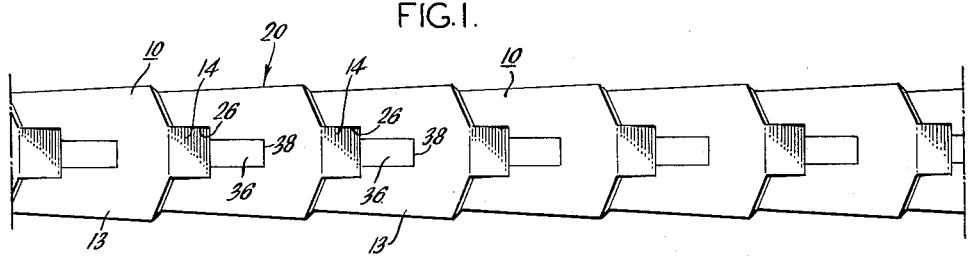
FIG.2.
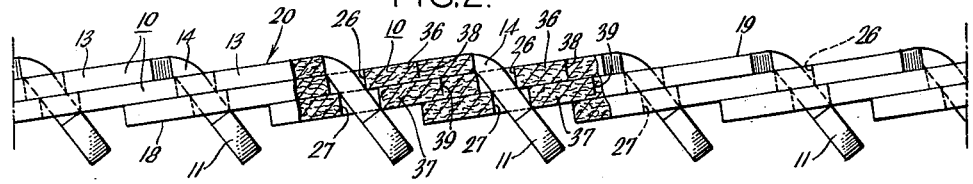
FIG.3.   FIG.3a.
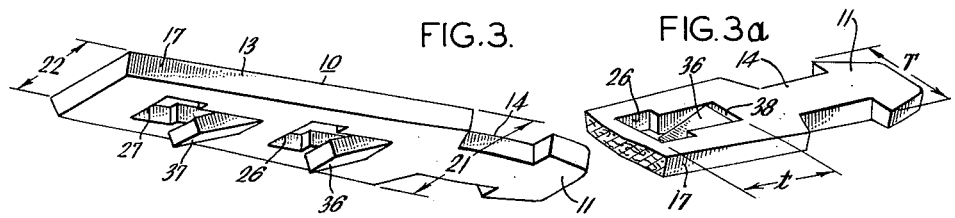
FIG.4.
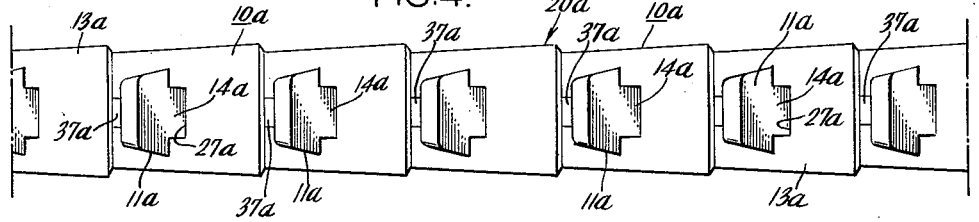
FIG.5.
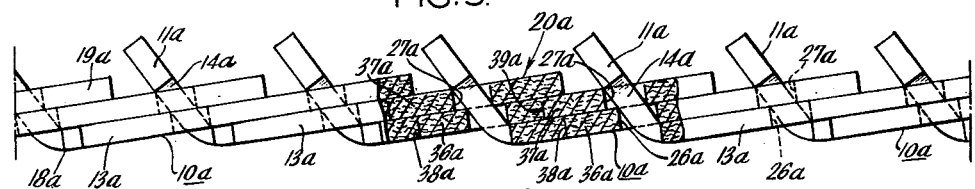
FIG.6.
INVENTOR:
CLIFFORD A. CRESWELL
BY Howson & Howson
ATTYS.

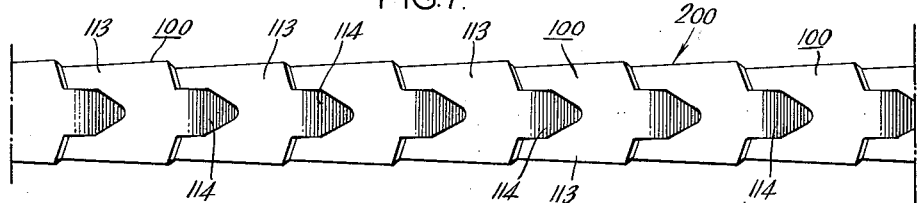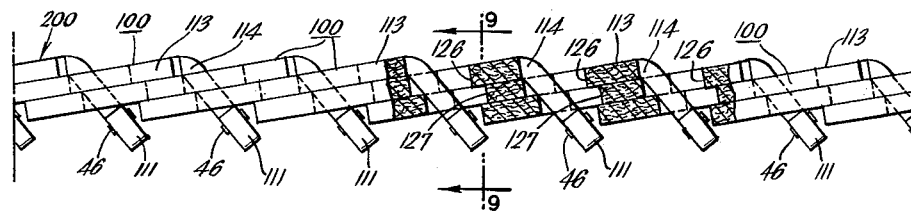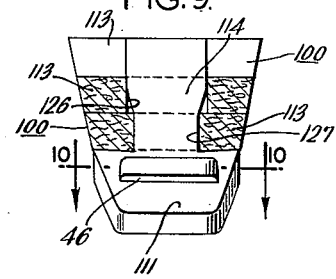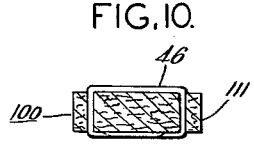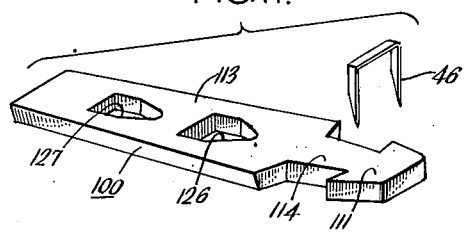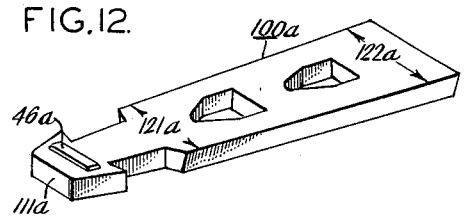

United States Patent Office 3,154,960
Patented Nov. 3, 1964

3,154,960
DRIVE BELTS
Clifford Allen Creswell, Lancaster, Pa., assignor to The Arbee Corporation, Manheim, Pa., a corporation of Pennsylvania
Filed Oct. 7, 1963, Ser. No. 314,408
7 Claims. (Cl. 74—233)

The present invention relates to new and useful improvements in belts and more particularly belts of a type comprising a number of superimposed links secured together by fastening means integral with the link and which pass through openings formed in the links, or so-called self-interlocked belts.

While the present invention has particular application to V-belts for use in either constant or variable speed transmissions, it also has application to flat belts for drive purposes.

As stated in the co-pending application Serial Number 213,667, filed July 31, 1962, prior to the invention of self-interlocked belts, drive belts which are designed for driving heavy loads and for intermediate and variable speed transmissions, were thought best to be composed of separate links of tough material, with the separate links secured to each other by metal fasteners such as rivets. However, there are inherent disadvantages in using metal to secure links to each other.

As pointed out in the co-pending application, the use of a self-interlocked belt in which superimposed links are secured together by locking tabs integral with the links, overcomes the inherent disadvantage in using metal fasteners to secure the links to each other. However, self-interlocked belts have certain limitations which it is the principal object of the present invention to overcome.

It has been found that very narrow belts such as A size V-belts, constructed in accordance with the teachings of the co-pending application, do not have a life expectancy commensurate with the materials used in the link, especially at high loads. The reason for this is that after the links were attached in superimposed successive overlapping relation, and the outside edge was trimmed so as to make the belt adaptable to any standard V-groove sheave, some of the locking tab would also be trimmed, and under high stress and because of the reduced width of the locking tab, the tabs had a tendency to pull through.

Further, it has been found that in the C size V-belt, the belt had a tendency to buckle transversely under conditions of high stress thus permitting the locking tab to pull through.

With the foregoing in mind, a primary object of the present invention is to provide an improved interlocking segmented belt which can be made endless and in which a link may be inserted or removed at any point to lengthen or shorten the belt.

Another object of the present invention is to overcome the afore-mentioned disadvantages in this type belt by improving the lateral stability and the durability of the belt.

More specifically the present invention provides a self-interlocking belt having anti-pull through means in each of the links to prevent the locking tab of the preceding link from inadvertently pulling through the aperture in the succeeding link.

Other objects and a fuller understanding of the invention may be had by referring to the following description and claims taken in conjunction with the accompanying drawings in which:

FIG. 1 is a plan view of one form of a belt embodying the present invention;

FIG. 2 is a side elevational view of the belt shown in FIG. 1 with portions broken away to show details of the construction of the belt;

FIG. 3 is a perspective view of a link of the belt shown in FIGS. 1 and 2;

FIG. 3a is a fragmentary perspective view of the link shown in FIG. 3;

FIG. 4 is a plan view of another form of a belt constructed in accordance with the present invention;

FIG. 5 is a side elevational view of the belt shown in FIG. 4 with portions broken away to show details of the construction of the belt;

FIG. 6 is a perspective view of a link of the belt shown in FIGS. 4 and 5;

FIG. 7 is a plan view of another form of a belt constructed in accordance with the present invention;

FIG. 8 is a side elevational view of the belt shown in FIG. 7 with portions broken away to show details of the construction of belt;

FIG. 9 is a transverse sectional view taken along line 9—9 of FIG. 8;

FIG. 10 is a fragmentary enlarged sectional view taken along line 10—10 of FIG. 9;

FIG. 11 is a perspective view of a link of the belt shown in FIGS. 7 and 8; and

FIG. 12 is a perspective view of a link used in another form of a belt constructed in accordance with the present invention.

Referring now to the drawings and more particularly to FIGS. 1, 2, and 3 thereof, the belt 20 comprises a plurality of superimposed links 10 joined together by integral fastening means. As shown in FIG. 3, each fastening means comprises a locking tab 11 joined to the body 13 of the link 10 through a constricted neck 14. As illustrated in FIG. 2 the locking tab 11 is spaced a sufficient distance from the body 13 to receive therebetween two of the links 10.

A similar belt 20a is shown in FIGS. 4 and 5. As the link configuration of the belt 20a (best shown in FIG. 6) is similar to that shown in FIG. 3, the numbers used in FIGS. 4, 5, and 6 are identical to the numbers used in FIGS. 1, 2, and 3 except that those in FIGS. 4, 5, and 6 are suffixed with a letter "a." It should be understood that the following discussion of the operation and forms of the belt 20 are also generally applicable to the belt 20a.

The links 10 are provided with registering apertures for receiving the locking tabs 11 and the neck 14 of preceding links 10 as they are assembled in superimposed relation. As shown in FIG. 3 each link 10 is provided with a forward aperture 26 and a trailing aperture 27. When the links are assembled in successive superimposed overlapping relation, the trailing aperture 27 is in registry with the forward aperture 26 of the succeeding link, so that the locking tab 11 of the overlapping link first passes through the forward aperture 26 of the succeeding link and then through the trailing aperture 27 of the next succeeding link, and then bears against the inner surface of the latter link.

In accordance with the invention, in order to provide lateral stability of the belt when it is running in a V-type sheave, anti-pull through means are provided in each of the links to prevent the locking tab of the preceding link from pulling through the aperture in the succeeding link. To this end, and as illustrated in FIGS. 3 and 3a, hinged check means 36 and 37 are provided in the body 13 of the link 10 associated with the forward aperture 26 and the trailing aperture 27 respectively. As is clearly illustrated in FIGS. 3 and 3a, the hinged check means are preferably formed by providing parallel longitudinal cuts in the body 13 of the link 10, which cuts extend from the aperture a distance $t$ from the opposite wall of the aperture equal to the lateral width $T$ of the locking tab 11. Further, the lateral width of the hinged check means must be at least equal to the thickness of the link. As is illustrated in FIGS. 1 and 3, the hinge effect is afforded the check means 36 and 37 by scores 38 and 39 (see FIGS. 2 and 3a) cutting through a portion of the body 13 at the terminus of the longitudinal cuts, but leaving a sufficient quantity of material to supply a hinge. Further, it should be noted that in the embodiment illustrated in FIGS. 1–3, the hinged check means 36 and 37 are so provided as to swing only in the direction in which the locking tab 11 passes through the succeeding link 10. This means that the hinged check member permits the apertures 26 and 27 to become longer in the axial direction than they are wide so that the locking tab 11 of the link to be assembled in superimposed relation, when twisted so as to align axially with the apertures, will more easily pass through the apertures. When the locking tab 11 is released from its twisted position, it aligns crosswise with the belt in a position perpendicular to the longitudinal axis of the links 10 and since the width of the apertures is less than the length, and in fact in the preferred embodiment the width of the apertures 26 and 27 is constructed so as to be no wider than the width of the neck 14, the locking tab 11 is unable to pass through the apertures and thus is locked in position against the inner surface of the innermost link (see FIG. 2). Thereafter, it is a simple matter to move the hinged check member back into a position pressing against the neck 14 of the integral fastening means.

It should be noted that the anti-pull through means comprising the integral hinged check means 36 and 37 permit the adjacent apertures 26 and 27 respectively associated therewith, to be constructed in such a manner as to more firmly engage the neck 14 of the integral fastening means. Further, the hinged member 36 and 37, by permitting the aperture to more firmly press against the neck, prevents the belt when running in a sheave from buckling in the transverse direction, thus providing lateral stability to the running belt. Further, the hinged check member, as previously pointed out, in providing a reduced aperture size, prevents the inadvertent pull through of the locking tabs 11 of the links 10.

As previously stated, FIGS. 3 and 6 show two different forms of the link as they appear in their respective belt forms as is illustrated in FIGS. 1 and 4. FIG. 2 shows the preferred embodiment of the belt with the locking tab 11 on the inner periphery 18, when in operation in a typical V-belt sheave. Alternatively FIGS. 4 and 5 show an alternate form of the belt 20a wherein the integral locking tabs 11a ride on the outer periphery 19a of the belt. The difference between the forms exhibited in FIGS. 3 and 6 is that in the belt 20 with the locking tab 11 on the inner periphery 18, the head portion 21 of the link 10 is wider than the tail portion 22, thus facilitating the natural curvature of the superimposed links 10 by placing the widest portion of the link 10 on the outer periphery 19 of the belt 20. Alternatively, as is illustrated in FIG. 6, in the belt 20a when the integral locking tabs 11a lie on the outer periphery 19a, the head portion 21a is not as wide as the tail portion 22a. In this embodiment the widest portion of the link 10a is the tail portion 22a which lies on the outer periphery 19a of the belt 20a, and as before, the longitudinal center line of the belt tends to curve convexly. Thus by making the head portion wider than the tail portion, or vice versa, depending upon whether the locking tabs lie on the inner or outer periphery of the belt, the longitudinal center line of the links automatically assume a convex curvature upon assembly in successive superimposed overlapping relation.

In the embodiment of the link as illustrated in FIG. 6, anti-pull through means comprising integral hinged check means 36a and 37a are provided adjacent each of the apertures 26a and 27a respectively and associated therewith. As before, the hinged check means are hingeable in a direction to permit the fastening means of the preceding link to pass therethrough. The anti-pull through means which in the present instance comprise the integral check members 26a and 27a hinged along score lines 38a and 39a (see FIG. 5) are also afforded the attributes as described with the links associated with the belt wherein the locking tabs lie on the inner periphery of the belt.

Despite the fact that the superimposed links are generally V-shaped in cross section, the edges 17 and 17a of the V would appear to be stepped. Therefore, in the final form and after assembly, the edges of the links are trimmed to insure proper seating in the associated sheaves. Many times during the trimming operation, especially with belts of narrow width such as an A size belt, portions of the integral fastening means, notably the locking tab 11, are trimmed, substantially weakening the locking tab and causing it to pull through when a belt composed of such links is used under heavy load conditions in a V-belt sheave. Further, it has been found that in very narrow belts, notably belts of the A size, anti-pull through means comprising an integral hinged check member such as disclosed in FIGS. 1–6 and as heretofore described, are very difficult to fabricate in a link.

Therefore an alternate anti-pull through means, comprising a stiffening means for the integral locking tabs is provided in accordance with another feature of the invention. To this end, and as illustrated in FIGS. 7–11, and especially FIGS. 9, 10, and 11, the stiffening means comprises a staple 46 which is applied to the locking tab 111, preferably after the belt has been constructed of the individual links 100 in superimposed successive overlapping relation. As may be observed in FIG. 9, passing the staple 46 through the locking tab serves to stiffen the locking tab preventing transverse buckling and avoiding inadvertent pull-throughs when the belt is in tension.

Although the stiffening means is shown as a staple, it should be realized that any means of stiffening the tab so as to prevent the inadvertent pull through of the tab may be utilized. For example, a stiffening wire may be used to pass through the tab in a direction transverse to the longitudinal axis of the length and thereby stiffen the tab and prevent its being pulled through upon the belt being placed in tension.

It should be noted that although steel type reinforcing members or stiffening members may be utilized as anti-pull through means, in atmospheres requiring elimination of all possibilities of the inadvertent striking of a spark, which would occur for example if the belt bottomed in the pulley sheave, the stiffening members 46 may be composed of a nonsparking metal or a rigid plastic composition.

The belt illustrated in FIGS. 7 and 8 is constructed in the same manner as the belt discussed with regard to FIGS. 1 and 2, and generally comprises a plurality of superimposed links 100 joined together by integral fastening means. Each of the fastening means comprises a locking tab 111 joined to the body 113 of the link 100 through a constricted neck 114. As illustrated in FIGS. 7 and 8, the locking tab 111 is spaced a sufficient distance apart from the body 113 to receive therebetween two of the links 100. As previously discussed, with reference to FIGS. 1 and 2, the links 100 are provided with registering apertures for receiving the locking tabs 111 and the neck 114 of preceding links 100 as they are assembled in superimposed relation. As illustrated in FIG. 11, the links 100 are provided with forward apertures 126 and trailing apertures 127.

When the links are assembled in successive superimposed overlapping relation, the trailing aperture 127 is in registry with the forward aperture 126 of the succeeding link, so that the locking tab 111 of the overlapping link first passes through the forward aperture 126 of the succeeding link and then through the trailing aperture 127 of the next succeeding link, and then bears against the inner surface of the latter link. For ease of belt assembly, both of the apertures 126 and 127 are longer in the axial direction than they are wide so that the locking tab 111 of the link to be assembled in superimposed relation, when twisted so as to align axially with the apertures, will more easily pass therethrough. When the locking tab 111 is released from its twisted position, it aligns crosswise with the belt 200 in a position perpendicular to the longitudinal axis of the links 100 and since the width of the aperture is less than the link, the locking tab 111 is unable to pass through the apertures and thus is locked in position against the inner surface of the innermost link as shown in FIG. 9.

The link 100a shown in FIG. 12 is substantially the same as that shown in FIG. 6, the only difference between the link 100a illustrated in FIG. 12 and the link 100 illustrated in FIG. 11 is that the integral locking tabs 111a will ride on the outer periphery of the belt because the head portion 121a of the link 100a is narrower than the tail portion 122a. Further, although the integral locking tab 111a will ride on the outer periphery of the belt, and therefore not present the problem when trimming the edge of the tab, it has been found that the addition of a stiffening member, in accordance with the invention, to the integral locking tab 111a permits a belt constructed in accordance with the invention to withstand higher loads for greater periods of time.

The invention herein described is a major step in advancing the art of link type belts. By providing anti-pull through means, in the instance of wider belts the anti-pull through means comprising an integral hinged check member, and in the instance of narrower belts the anti-pull through means comprising a stiffening member for the integral locking tab, the strength and load carrying capacities of such a belt are greatly increased. Further, the application of the anti-pull through means to a belt of this type not only prevents the inadvertent pulling through of the integral locking means when the belt is under heavy loads, but also gives greater lateral stability of the belt.

Although the invention has been described with a certain degree of particularlity, it is understood that the present disclosure has been made only by way of example and that numerous changes and details of construction and the combination and arrangement of parts may be made without departing from the spirit and the scope of the invention, as hereinafter claimed.

What is claimed is:

1. An endless belt comprising a plurality of links arranged in superimposed successive overlapping relation, each of said links having at least one aperture and at least one integral fastening means, said integral fastening means comprising a locking tab and a constricted neck portion at one end of said link, each of said integral fastening means composed of the same material as the link and extending through the aperture in the succeeding link to secure said plurality of links together in overlapping relation, and anti-pull through means in each of said links comprising a stiffening means in said locking tab, said stiffening means extending substantially transverse to the longitudinal axis of said link whereby said locking tab of the preceding link is prevented from inadvertently pulling through the aperture in the succeeding link.

2. An endless belt comprising a plurality of links arranged in superimposed successive overlapping relation, each of said links having a plurality of apertures and at least one integral fastening means, said integral fastening means comprising a locking tab and a constricted neck portion at one end of said link, said integral fastening means composed of the same material as the link and extending through an aperture in the succeeding link and securing said plurality of links together in overlapping relation, and anti-pull through means in each of said links comprising a stiffening means in said locking tab, said stiffening means extending substantially transverse to the longitudinal axis of said link whereby said locking tab of the preceding link is prevented from inadvertently pulling through the aperture in the succeeding link.

3. An endless belt according to claim 2 wherein said apertures and fastening means are aligned longitudinally of the link, with each fastening means extending through one of the apertures in the succeeding link and an aperture in the next succeeding link.

4. A belt according to claim 3, wherein each link tapers in width, the widest portion of said link being adjacent to the integral fastening means so that the belt comprising a plurality of said links is substantially V-shaped in transverse cross section with a locking tab disposed within the apex of the V-shape.

5. A belt according to claim 3, wherein each link tapers in width, the narrowest portion of said link being adjacent to the integral fastening means so that the belt comprising a plurality of said links is substantially V-shape in transverse cross section with a locking tab disposed opposite the apex in the V-shape.

6. A belt comprising a plurality of links arranged in superimposed successive overlapping relation, each of said links having a body portion, an integral fastening means comprised of a constricted neck portion and a locking tab connected to said body portion at one end through said neck portion, said body portion having a forward and a trailing aperture, said integral fastening means being composed of the same material as the link, said neck portion extending through said forward aperture of the succeeding link and said trailing aperture of the next succeeding link and terminating thereafter in said locking tab securing said succession of links together in overlapping relation, and anti-pull through means in each of said links comprising a stiffening means in said locking tab, said stiffening means extending substantially transverse to the longitudinal axis of said link whereby said locking tab of the preceding link is prevented from pulling through the aperture in the succeeding link.

7. A belt according to claim 6 wherein said stiffening means comprises a staple.

References Cited in the file of this patent

UNITED STATES PATENTS

| 1,048,236 | Tuttle | Dec. 24, 1912 |
| 1,580,998 | Crocker | Apr. 13, 1926 |

FOREIGN PATENTS

| 166,936 | Great Britain | July 6, 1921 |
| 211,957 | Great Britain | Feb. 29, 1924 |
| 415,340 | Germany | June 18, 1925 |